US011159524B2

United States Patent
Song

(10) Patent No.: US 11,159,524 B2
(45) Date of Patent: Oct. 26, 2021

(54) NETWORK ACCESS CONTROL

(71) Applicant: NEW H3C TECHNOLOGIES CO., LTD., Hangzhou (CN)

(72) Inventor: Yubing Song, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 353 days.

(21) Appl. No.: 16/324,598

(22) PCT Filed: Sep. 8, 2017

(86) PCT No.: PCT/CN2017/101071
§ 371 (c)(1),
(2) Date: Feb. 11, 2019

(87) PCT Pub. No.: WO2018/045994
PCT Pub. Date: Mar. 15, 2018

(65) Prior Publication Data
US 2019/0182249 A1  Jun. 13, 2019

(30) Foreign Application Priority Data

Sep. 9, 2016  (CN) .......................... 201610813220.5

(51) Int. Cl.
*H04L 29/06* (2006.01)
*H04L 29/08* (2006.01)
(Continued)

(52) U.S. Cl.
CPC ........ *H04L 63/0876* (2013.01); *H04L 61/203* (2013.01); *H04L 61/2007* (2013.01);
(Continued)

(58) Field of Classification Search
CPC ............. H04L 63/0876; H04L 63/2007; H04L 63/2015; H04L 63/203; H04L 63/2053;
(Continued)

(56) References Cited

U.S. PATENT DOCUMENTS 7,310,671 B1 * 12/2007 Hassell .................. H04L 41/04
709/224
8,589,568 B2 * 11/2013 Arnold .............. H04L 29/12301
709/228
(Continued)

FOREIGN PATENT DOCUMENTS

CN      1708021     12/2005
CN     102244866    11/2011
(Continued)

OTHER PUBLICATIONS

Zheng, English Translation of CN Patent Application Publication CN 102572005, Nov. 2012, WIPO, patentscope.wipo.int/search/en/detail.jsf?docPN=CN 102572005 (Year: 2012).*
(Continued)

*Primary Examiner* — Ruolei Zong
(74) *Attorney, Agent, or Firm* — Norton Rose Fulbright US LLP

(57) ABSTRACT

The present disclosure discloses methods of controlling network access, NASs and non-transitory machine-readable storage mediums. In an example of the present disclosure, when a terminal comes online for a first time, a NAS obtains a temporary role for a terminal; when receiving an IP address request from the terminal, the NAS requests an IP address for the terminal, wherein a lease for the temporary IP address is a set minimum lease; the NAS forces the terminal to go offline when the portal authentication is successful; when the terminal comes online for a second time, the NAS obtains a service role for the terminal; when receiving an IP address request sent by the terminal at expiry of the lease for the temporary IP address, the NAS requests a service IP address for the terminal, wherein the service IP address belongs to an IP network segment corresponding to the service role.

15 Claims, 5 Drawing Sheets

(51) Int. Cl.
　　　*H04L 29/12*　　(2006.01)
　　　*H04W 12/06*　　(2021.01)
　　　*H04W 84/12*　　(2009.01)
　　　*H04W 12/71*　　(2021.01)

(52) U.S. Cl.
　　　CPC ...... *H04L 61/2015* (2013.01); *H04L 61/2053* (2013.01); *H04L 61/2061* (2013.01); *H04L 63/105* (2013.01); *H04L 67/1097* (2013.01); *H04W 12/06* (2013.01); *H04W 12/71* (2021.01); *H04W 84/12* (2013.01); *H04L 61/6022* (2013.01)

(58) Field of Classification Search
　　　CPC ............. H04L 63/2061; H04L 63/6022; H04L 63/105; H04L 67/1097; H04W 12/71; H04W 12/06; H04W 84/12
　　　USPC ............................................................ 706/6
　　　See application file for complete search history.

(56) References Cited

U.S. PATENT DOCUMENTS

| | | | | |
|---|---|---|---|---|
| 2011/0138065 | A1* | 6/2011 | Nagy | H04L 61/2007 709/228 |
| 2013/0332982 | A1 | 12/2013 | Rao et al. | |
| 2014/0052860 | A1* | 2/2014 | Duggal | H04L 63/0892 709/225 |
| 2014/0096214 | A1* | 4/2014 | Sheth | G06F 21/40 726/7 |
| 2014/0237544 | A1* | 8/2014 | Higuchi | H04L 63/168 726/3 |
| 2015/0304334 | A1* | 10/2015 | Zheng | H04L 67/02 726/5 |
| 2016/0036771 | A1* | 2/2016 | Yadav | H04L 41/0803 709/223 |
| 2016/0380962 | A1* | 12/2016 | Johnson | H04L 61/2007 370/328 |
| 2018/0007550 | A1* | 1/2018 | Williams | H04L 65/1069 |

FOREIGN PATENT DOCUMENTS

| | | |
|---|---|---|
| CN | 102572005 | 7/2012 |
| CN | 103118064 | 5/2013 |
| CN | 103220374 | 7/2013 |
| CN | 103475751 | 12/2013 |
| CN | 104618522 | 5/2015 |
| JP | 2003273868 | 9/2003 |
| JP | 2003338814 | 11/2003 |
| JP | 2003348114 | 12/2003 |
| JP | 2005286558 | 10/2005 |
| JP | 2010093585 | 4/2010 |
| JP | 2010171505 | 8/2010 |
| JP | 2015536072 | 12/2015 |
| JP | 2016118930 | 6/2016 |
| WO | WO 2013/041882 | 3/2013 |
| WO | WO 2015/196755 | 12/2015 |

OTHER PUBLICATIONS

International Search Report and Written Opinion issued in International Patent Application No. PCT/CN2017/101071, dated Nov. 30, 2017.
Office Action issued in corresponding Chinese application No. 201610813220.5, dated Dec. 13, 2019.
Office Action issued in corresponding Japanese application No. 2019-512920, dated Jan. 28, 2020 (Machine translation provided).
Extended Search Report issued in Corresponding European Patent Application No. 17848167.7 dated Jul. 18, 2019.
Office Action issued in Corresponding Chinese Patent Application No. 201610813220.5, dated Jul. 9, 2019.

* cited by examiner

NETWORK ACCESS CONTROL

CROSS REFERENCE TO RELATED APPLICATIONS

This application is a national phase under 35 U.S.C. § 371 of International Application No. PCT/CN2017/101071, filed on Sep. 8, 2017, which claims priority to Chinese Patent Application No. 201610813220.5, filed on Sep. 9, 2016, the entire contents of each of which are incorporated herein by reference.

BACKGROUND

In a Virtual Extensible Local Area Network (VxLAN), a process of allocating an IP address for a terminal based on a service role includes that a relationship between an IP network segment and a service role is predefined so that the service role corresponds to the IP network segment, a service role for a terminal is determined based on account information of the terminal, and an address is requested for the terminal within the IP network segment corresponding to the service role, wherein the service role may be a service VxLAN or a service Virtual Local Area Network (VLAN).

In the VxLAN, an IP address for a terminal follows the terminal, a control plane and a data plane in the VxLAN are separated. Thus, an existing portal authentication cannot be used in the VxLAN.

DETAILED DESCRIPTION OF THE EMBODIMENTS

The foregoing disclosure is merely illustrative of preferred embodiments of the disclosure but is not intended to limit the disclosure, and any modifications, equivalent substitutions, adaptations, thereof made without departing from the spirit and scope of the disclosure shall be encompassed in the claimed scope of the appended claims.

When an Internet Protocol (IP) address is allocated for a terminal based on a service role, it can be achieved that regardless where a terminal moves to, it is not required to adjust an IP address of the terminal as long as a service role of the terminal is not changed, thus, the IP address of the terminal can follow the terminal.

In a VxLAN, an IP address of a terminal follows a terminal and a control plane and a data plane in the VxLAN are separated, thus, the portal authentication cannot apply to the VxLAN. Based on this, at present, there is an urgent technical problem to be solved how to control a terminal to perform network access in the VxLAN.

To differentiate from the Portal authentication, a method of controlling network access in a VxLAN is referred to as a Media Access Control (MAC) Portal authentication in examples of the present disclosure.

Figure 1:
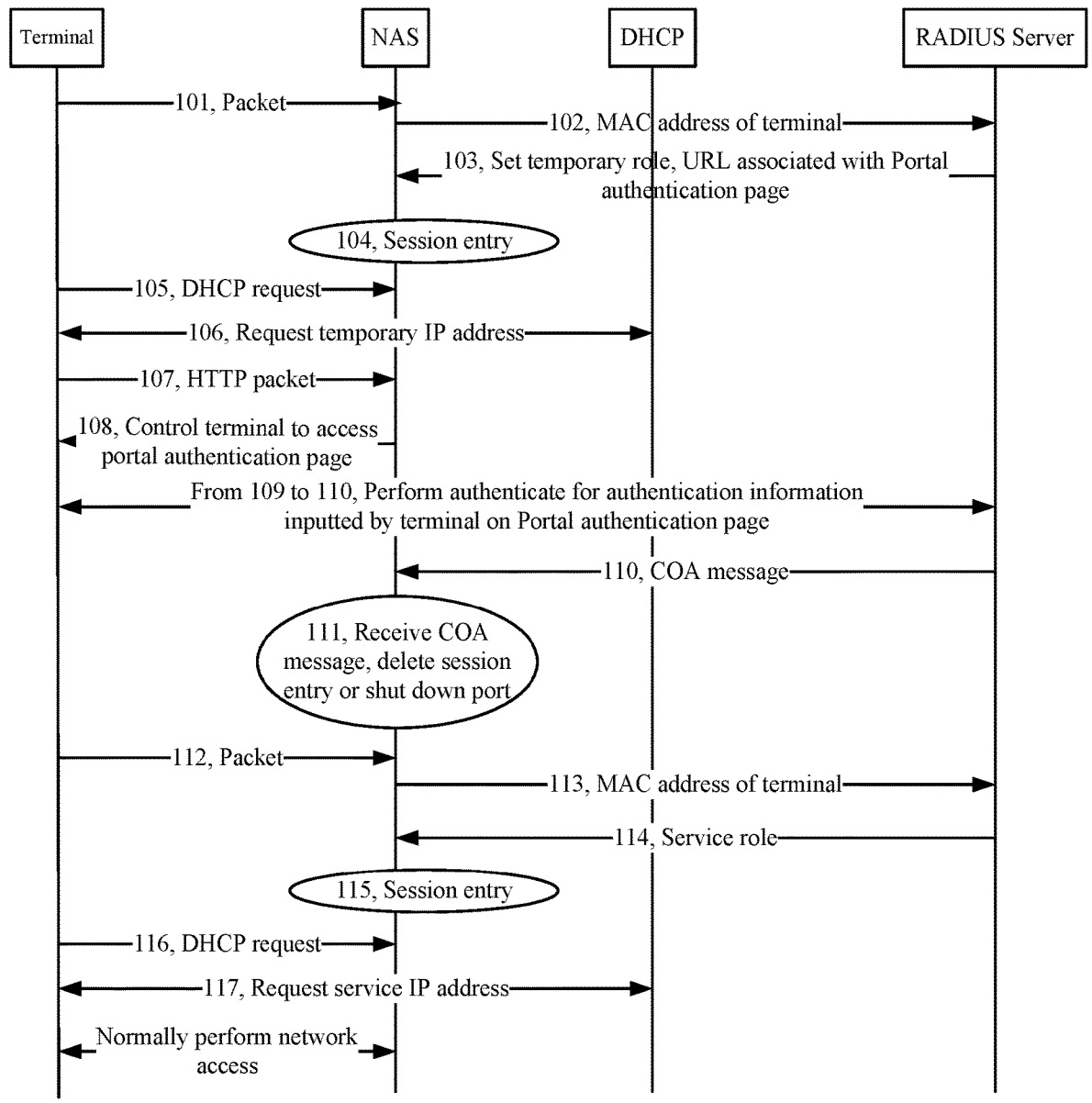
FIG. 1 is a schematic diagram illustrating a MAC Portal authentication based on an example of the present disclosure.

FIG. 1 is a schematic diagram illustrating a MAC Portal authentication based on an example of the present disclosure. The MAC Portal authentication is performed through interactions among a Remote Authentication Dial In User Service (RADIUS) Server, a Network Attached Server (NAS) and a terminal. Thus, the interactions among the RADIUS Server, the NAS and the terminal are mainly described, and other devices are not described herein.

In an example of the present disclosure, the RADIUS Server may be an End User Intelligent Access (EIA) Component. The NAS may be a Leaf device in a Spine-Leaf hierarchical structure for an Ethernet Virtual Private Network (EVPN), or a wireless Access Controller (AC).

The MAC Portal authentication based on an example as shown in FIG. 1 includes procedures as follows.

In block 101, a terminal sends a packet to NAS after coming online for a first time.

After coming online, the terminal may send a packet based on an actual service requirement. The packet may be a data packet or a protocol packet, which is not limited in examples of the present disclosure. A source MAC address of the packet sent by the terminal is an MAC address of the terminal.

In block 102, the NAS receives the packet sent by the terminal, and sends a MAC address of the terminal to an RADIUS Server when the NAS determines that a session entry matched to the terminal is not stored in the NAS.

In an example of the present disclosure, the MAC address of the terminal may be carried in an Access request to be sent to the RADIUS Server.

In block 102, the session entry matched to the terminal is described below.

In block 103, the RADIUS Server receives the MAC address of the terminal sent from the NAS, and sends a set temporary role and the a Uniform Resource Locator (URL) associated with a Portal authentication page to the NAS, when the RADIUS Server determines that terminal account information corresponding to the MAC address of the terminal is not stored in the RADIUS Server.

In an example, the set temporary role and the URL associated with the Portal authentication page may be carried in an Access accept to be sent to the NAS.

In block 103, When the RADIUS Server determines that there is no terminal account information corresponding to the MAC address of the terminal in the RADIUS Server, it is determined that the terminal comes online for the first time. In an example of the present disclosure, the RADIUS Server may uniformly set a temporary role for a terminal which comes online for the first time, and only allows the terminal which comes online for the first time to perform access based on the set temporary role. In an example, the set temporary role may be a VLAN or a VxLAN. In order to make description clearer, the set temporary role is uniformly referred to as a Guest VLAN/VxLAN in examples of the present disclosure.

In block 104, the NAS receives the Guest VLAN/VxLAN and the URL associated with the Portal authentication page, and creates a session entry matched to the terminal in the NAS, wherein the Guest VLAN/VxLAN and the URL are sent from the RADIUS Server.

In an example, in block 104, the created session entry at least includes terminal information such as an MAC address of a terminal.

In an example, in the block 104, the received Guest VLAN/VxLAN and the received URL of the Portal authentication page may further be recorded in the created session entry.

In block 105, when the terminal requests an IP address based on a service requirement, the terminal sends a Dynamic Host Configuration Protocol (DHCP) request to the NAS for requesting an IP address.

In block 106, the NAS receives the DHCP request, requests an IP address (denoted as a temporary IP address) in an IP network segment corresponding to the temporary role for the terminal, and notifies the temporary IP address to the terminal.

In block 106, the NAS requests the temporary IP address for the terminal through interactions with a DHCP server.

In block 107, the terminal receives the temporary IP address and sends a Hyper Text Transfer Protocol (HTTP) packet based on the temporary IP address.

In block 107, a source IP address of the HTTP packet is the temporary IP address.

In block 108, the NAS captures the HTTP packet sent by the terminal, and controls the terminal to access the Portal authentication page based on a HTTP redirection processing method.

In an example, the HTTP redirection processing method includes that by acting as a HTTP Server, the NAS feeds a redirection message back to the terminal to notify the terminal that the URL to be accessed by the terminal is changed to the URL associated with the Portal authentication page. After receiving the redirection message, the terminal changes the URL to be accessed to be the URL associated with the Portal authentication page, and resends the HTTP request. After receiving the HTTP request sent by the terminal for a second time, the NAS sends the HTTP request to a portal server, and the portal server returns the Portal authentication page to the terminal, so as to implement that the terminal is controlled to access the Portal authentication page. The portal server herein may be a server integrated with or independent of the RADIUS Server.

In block 109, the terminal receives authentication information inputted by a user on the Portal authentication page, and sends the authentication information to the RADIUS Server.

In block 109, the authentication information may be account information of the terminal, a password of the terminal, etc.

In block 110, the RADIUS Server performs authentication based on the authentication information inputted by the user on the Portal authentication page; when the authentication passes, the RADIUS Server records a relationship between the MAC address and the account information of the terminal in the RADIUS Server, and sends an offline message (e.g., a Change-Of-Authorization (COA) message) so that the NAS forces the terminal to go offline.

In block 111, the NAS receives the COA message, and determines whether the terminal is a wireless terminal or a wired terminal; if the terminal is the wireless terminal, the NAS forces the terminal to go offline by deleting the session entry above; if the terminal is the wired terminal, the NAS changes a port to be a Down state to force the terminal to go offline and deletes the session entry above, wherein the port is on the NAS and connected with the terminal.

Based on procedures in block 111, the wireless terminal is eventually made offline. If the wireless terminal is made offline, it can come online again. When the terminal comes online again, procedures in block 112 is executed.

Based on procedures in block 111, the wired terminal is eventually made offline. For the wired terminal, the NAS changes the port to be an UP state, so as to indicate the wired terminal to come online again. When the wired terminal comes online again, procedures in block 112 is executed.

It should to be noted that, regardless whether the terminal is the wireless terminal or the wired terminal, the requested temporary IP address is not released by the terminal after the terminal is made offline.

Procedures in blocks Block 112 to 113 are similar as that in blocks 101 to 102, which are not repeatedly described herein.

In block 114, the RADIUS Server receives the MAC address of the terminal sent by the NAS; when determining that there is terminal account information corresponding to the MAC address of the terminal in the RADIUS Server, the RADIUS Server acquires a service role to which the terminal belongs based on the terminal account information, and sends the service role to the NAS.

The service role herein is different from the temporary role above. The service role is determined based on the terminal account information. In an example, for each piece of terminal account information, a relationship between the terminal account information and a service role may be preset in the RADIUS Server, so as to facilitate determination of the service role to which the terminal belongs based on the terminal account information. Based on this, in block 114, the process of determining the service role to which the terminal belongs based on the existing terminal account information includes: by taking the terminal account information as a keyword, searching for a relationship including the keyword among relationships in the RADIUS Server; determining a service role in the relationship searched out as the service role to which the terminal belongs. In an example, the service role herein is an applied service VLAN or an applied service VxLAN. To make description clearer, the service role is uniformly referred to as a service VLAN/VxLAN in examples of the present disclosure.

In block 115, the NAS receives the service role sent by the RADIUS Server, and records the session entry matched to the terminal in the NAS.

In an example, the NAS records the received service role to the session entry above.

In block 116, the terminal sends a DHCP request.

For a wired terminal, when a port of the NAS connected with the terminal is changed from the Down state to the UP state, the wired terminal comes online again and automatically sends a DHCP request.

For a wireless terminal, when coming online again, the wireless terminal may usually send a DHCP request, which, however, cannot be guaranteed 100% to send the DHCP request. If the DHCP request is not sent, it is caused that the temporary IP address above is still used by the terminal and cannot be changed to a service IP address below.

In block 117, the NAS receives the DHCP request from the terminal, requests an IP address (denoted as a service IP address) in an IP network segment corresponding to the service role for the terminal, and notifies the service IP address to the terminal.

When the NAS notifies the service IP address to the terminal, the terminal may normally perform network access based on the service IP address.

So far, the process shown in FIG. 1 ends.

It can be seen from the process shown in FIG. 1 that, to implement normal network access for the terminal, it is in demand that the IP address of the terminal is changed from the temporary IP address to the service IP address.

However, for a wired terminal, as described in block 113, the NAS changes the port connected with the terminal to be the Down state, so as to implement the IP address changing process above. However, when that the port is changed to be the Down state, problems as follows can occur. In particular, in a case that the wired terminal is not directly connected with the NAS (for example, the NAS is cascaded with a HUB), since only a downstream port of the NAS connected with the terminal is changed to be the Down state (hereinafter referred to as a down event) as well as the NAS and the terminal are spaced by another network device, a network card on the terminal may not perceive the down event above and still deem that the port is normally working. In this case, the terminal may not actively send a DHCP request and still work based on the temporary IP address, thus, the IP address changing process above cannot be implemented, which causes that the terminal cannot normally perform the network access.

After a wireless terminal is forced to go offline as described at block 112, the wireless terminal may usually send a DHCP request as described in block 118, which, however, cannot be guaranteed 100% to send the DHCP request. If the DHCP request is not actively sent in some cases, the terminal still works based on the temporary IP address, thus, the IP address changing process above cannot be implemented, which causes that the terminal cannot normally perform the network access.

Figure 2:
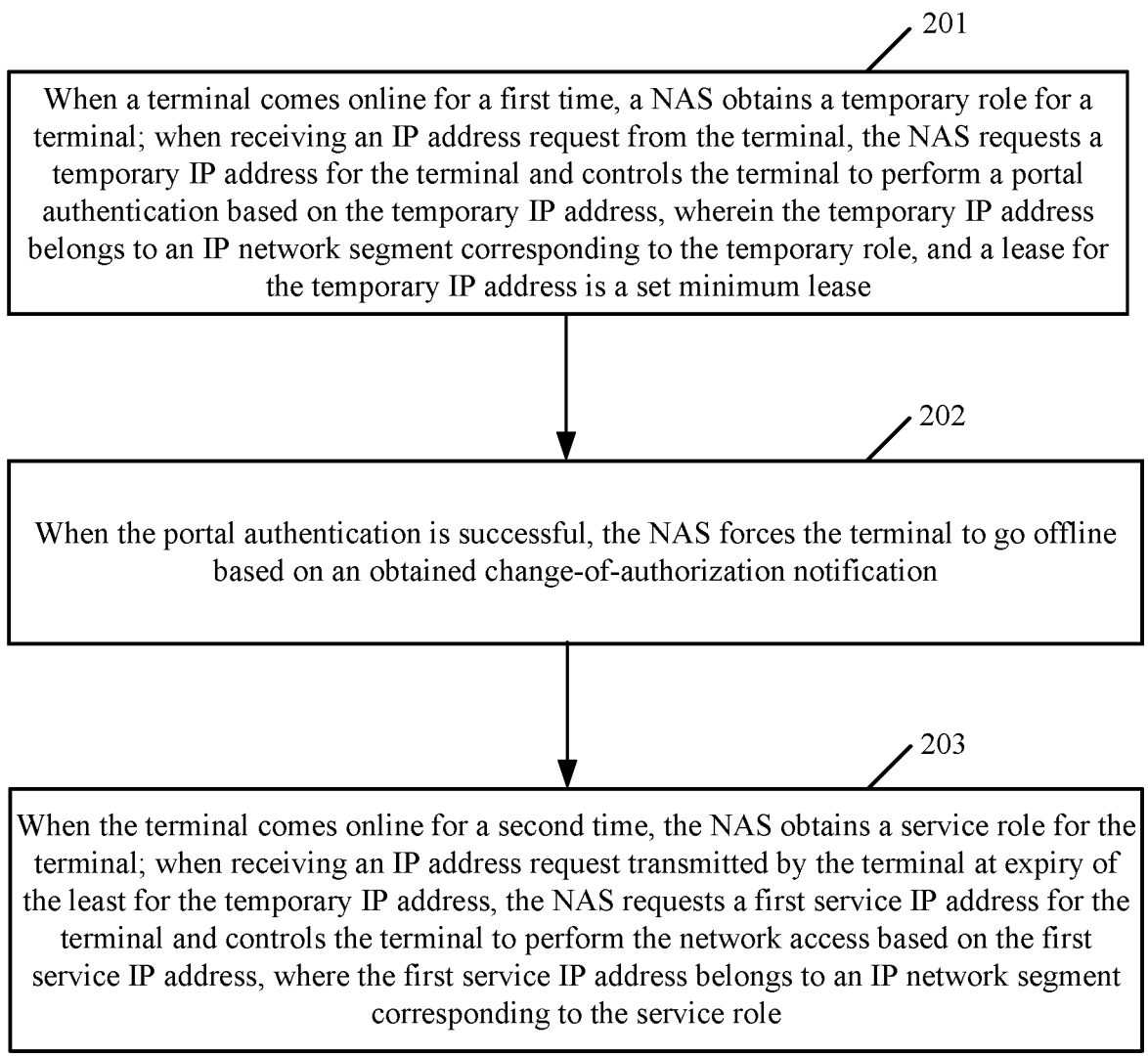
FIG. 2 is a schematic diagram illustrating a method of controlling network access based on an example of the present disclosure.

Based on this, in examples of the present disclosure, the MAC Portal authentication above is optimized. The optimized MAC Portal authentication is referred to as a MAC Portal Plus authentication. FIG. 2 is a schematic diagram illustrating a method of controlling network access based on an example of the present disclosure.

The method of controlling network access as shown in FIG. 2 includes procedures as follows.

In block 201, when a terminal comes online for a first time, a NAS obtains a temporary role for a terminal; when receiving an IP address request from the terminal, the NAS requests a temporary IP address for the terminal and controls the terminal to perform a portal authentication based on the temporary IP address, wherein the temporary IP address belongs to an IP network segment corresponding to the temporary role, and a lease for the temporary IP address is a set minimum lease.

In block 202, when the portal authentication is successful, the NAS forces the terminal to go offline based on an obtained change-of-authorization notification.

In block 203, when the terminal comes online for a second time, the NAS obtains a service role for the terminal; when receiving an IP address request sent by the terminal at expiry of the lease for the temporary IP address, the NAS requests a service IP address for the terminal and controls the terminal to perform the network access based on the service IP address, wherein the service IP address belongs to an IP network segment corresponding to the service role.

It can be seen that, when the terminal comes online for the second time and the lease for the temporary IP address expires, the terminal may send an IP address request. As described above, the lease for the temporary IP address is set as the minimum lease, thus, the terminal may soon send an IP address request for requesting a service IP address, thereby implementing that the IP address of the terminal can be quickly changed from the temporary IP address to the service IP address.

So far, the process shown in FIG. 2 ends.

It can be seen from the process shown in FIG. 2 that, compared with the MAC Portal authentication, the MAC Portal Plus authentication has advantages as follows.

In the MAC Portal Plus authentication, when a terminal comes online for the first time, a temporary IP address requested for the terminal is the IP address with the set minimum lease. For example, the minimum least may be set to be dozens of seconds or one minute. The IP address with the set minimum lease can trigger the terminal to initiate an IP address changing operation. Even though the terminal is a wired terminal, the NAS does not need to trigger the terminal to initiate the IP address changing operation by changing the port connected with the terminal to be the Down state. Besides, the IP address changing operation initiated for the terminal by means of the minimum lease is only performed once. Further, in the MAC Portal Plus authentication, the temporary IP address with the minimum lease can trigger the terminal to initiate the process of changing the IP address from the temporary IP address to the service IP address. Thus, applicability of an application can be enhanced. For example, MAC Portal Plus authentication can be used in a cascading scenario through a HUB so that the problem that the wireless terminal does not actively send the DHCP request can be further solved.

In the above-mentioned MAC Portal Plus authentication, as described above, the IP address changing operation is only performed once by means of the minimum lease, wherein the IP address changing process is denoted as a registration process in examples of the present disclosure. Any terminal only needs to perform registration once. That is, the IP address changing operation from the temporary IP address to the service IP address needs to be performed only once, thereby improving user experience.

Based on this, the process shown in FIG. 2 is further described in detail below by subdividing it into two separate processes, i.e., a process that a terminal comes online for a first time and a process that a terminal comes online after completing registration.

Figure 3:
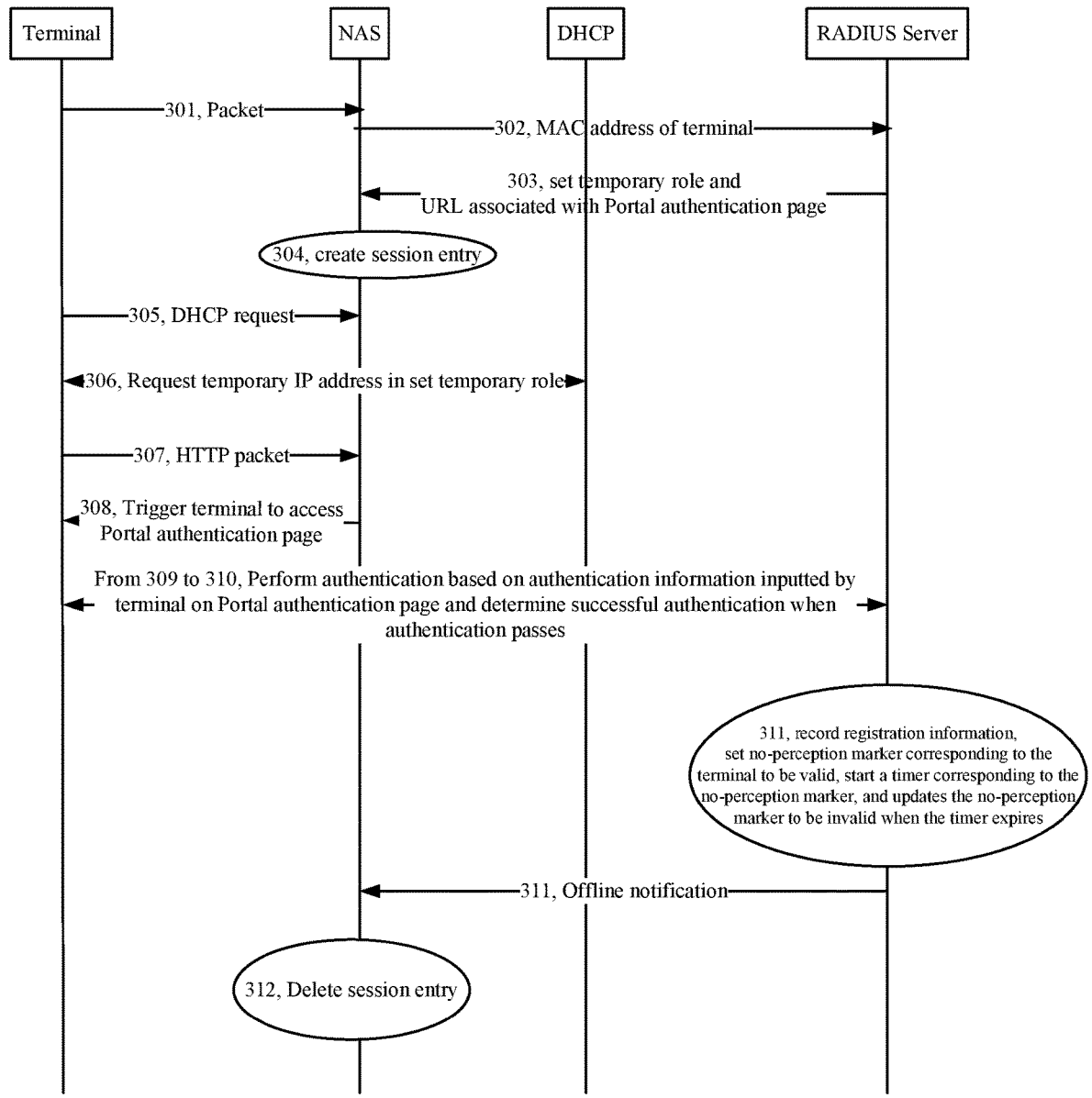
FIG. 3 is a schematic diagram illustrating a registration process that a terminal comes online for a first time based on an example of the present disclosure.

FIG. 3 is a schematic diagram illustrating a registration process that a terminal comes online for a first time based on an example of the present disclosure. As shown in FIG. 3, the process includes procedures as follows.

In block 301, a terminal sends a packet after coming online for a first time.

In block 302, an NAS receives a packet sent by the terminal, and sends an MAC address of the terminal to an RADIUS Server when determining that no session entry matched to the terminal is stored in the NAS.

In an example of the present disclosure, the MAC address of the terminal may be carried in an Access Request to be sent to the RADIUS Server.

In block 303, the RADIUS Server receives the MAC address of the terminal sent by the NAS, and sends a set temporary role (Guest VLAN/VxLAN) and a URL associated with a Portal authentication page to the NAS when the RADIUS Server determines that no registration information corresponding to the MAC address of the terminal is stored in the RADIUS Server.

When determining that no registration information corresponding to the MAC address of the terminal is stored in the RADIUS Server based on the MAC address of the terminal, the RADIUS Server determines that the registration is initiated by the terminal when the terminal comes online for the first time.

In an example, the set temporary role (Guest VLAN/VxLAN) and the URL associated the Portal authentication page may be carried in an Access Accept to be sent to the NAS.

In an example, in block 303, a first access control list (ACL) may be carried in the Access Accept together with the set temporary role (Guest VLAN/VxLAN) and the URL associated with the Portal authentication page to be sent to the NAS. In examples of the present disclosure, a first ACL is used for the NAS to only accept a DHCP packet and an HTTP request sent by the terminal with the temporary role and to deny any other packet, so as to force the terminal only to perform HTTP access or request an IP address based on DHCP.

In block 304, the NAS receives the Guest VLAN/VxLAN and the URL associated with the Portal authentication page sent by the RADIUS Server, and creates the session entry matched to the terminal in the NAS.

In an example, in block 304, the created session entry at least includes terminal information such as the MAC address of the terminal.

In an example, in block 304, the received Guest VLAN/VxLAN and the received URL associated with the Portal authentication page may further be recorded in the created session entry.

In block 305, the terminal sends a DHCP request for requesting an IP address.

In block 305, based on a service requirement of the terminal, the terminal sends the DHCP request for the IP address.

In block 306, the NAS receives the DHCP request from the terminal, requests a corresponding IP address (denoted as temporary IP address) in an IP network segment corresponding to the temporary role for the terminal, and notifies the temporary IP address to the terminal.

Based on the first ACL as described above, the NAS may eventually send the DHCP request to a DHCP Server so that the DHCP Server can allocate the temporary IP address for the terminal. In an example of the present disclosure, the DHCP request may be eventually sent to the DHCP Server in another manner instead of the first ACL so that the DHCP Server can allocate the temporary IP address for the terminal.

In block 306, a lease for the temporary IP address is a set minimum lease, e.g., one minute.

In block 307, the terminal receives the temporary IP address, and sends an HTTP packet based on the temporary IP address.

In block 307, a source IP address of the HTTP packet is the temporary IP address.

In block 308, the NAS captures the HTTP packet, and performs HTTP redirection processing so that the terminal accesses the Portal authentication page.

Based on the first ACL and the HTTP redirection processing method as described above, the terminal may eventually access the Portal authentication page. In an example of the present disclosure, the terminal may eventually access the Portal authentication page in another manner instead of the first ACL and the HTTP redirection processing method.

In block 309, the terminal receives authentication information inputted by a user on the Portal authentication page, and sends the authentication information to the RADIUS Server.

In block 309, the authentication information may be account information of the terminal, password of the terminal, etc.

Blocks 304 to 309 include a specific implementation that the NAS controls the terminal to perform the portal authentication based on the temporary IP address in block 202.

In block 310, the RADIUS Server perform authentication based on the authentication information inputted by the user on the Portal authentication page. When the authentication passes, procedures in block 311 are executed.

When the authentication information inputted by the user on the Portal authentication page passes the authentication of the RADIUS Server, it is indicated that the terminal is successfully registered to the RADIUS Server.

In block 311, the RADIUS Server records registration information corresponding to the MAC address of the terminal in the RADIUS Server (the registration information includes a relationship between the account information of the terminal and the MAC address of the terminal), sends an offline notification to the NAS, sets a no-perception marker corresponding to the terminal to be valid, starts a timer corresponding to the no-perception marker, and updates the no-perception marker to be invalid when the timer expires.

When the first ACL is sent to the NAS in block 303 above, the RADIUS Server further sends a first ACL deleting notification to the NAS in block 311.

In block 312, the NAS receives the offline notification, and deletes the session entry based on the offline notification to force the terminal to go offline.

In the MAC Portal Plus authentication, the NAS may delete the session entry matched to the terminal every time when the terminal goes offline.

It should be noted that, when the first ACL deleting notification is further sent to the NAS in block 311, the NAS further receives the first ACL deleting notification, and deletes the first ACL based on the first ACL deleting notification in block 312.

So far, the process shown in FIG. 3 ends.

In the flow shown in FIG. 3, after the terminal is registered to the RADIUS Server, the registration information corresponding to the MAC address of the terminal (specifically the relationship between the MAC address of the terminal and the account information of terminal) is stored in the RADIUS Server for a long time period, and may not be deleted regardless whether the no-perception marker is invalid. Since the registration information is stored in the RADIUS Server for the long time period, the RADIUS Server may directly allocate the service role for the terminal when the terminal comes online for the second time, which is specifically illustrated in description below corresponding to FIG. 4.

Figure 4:
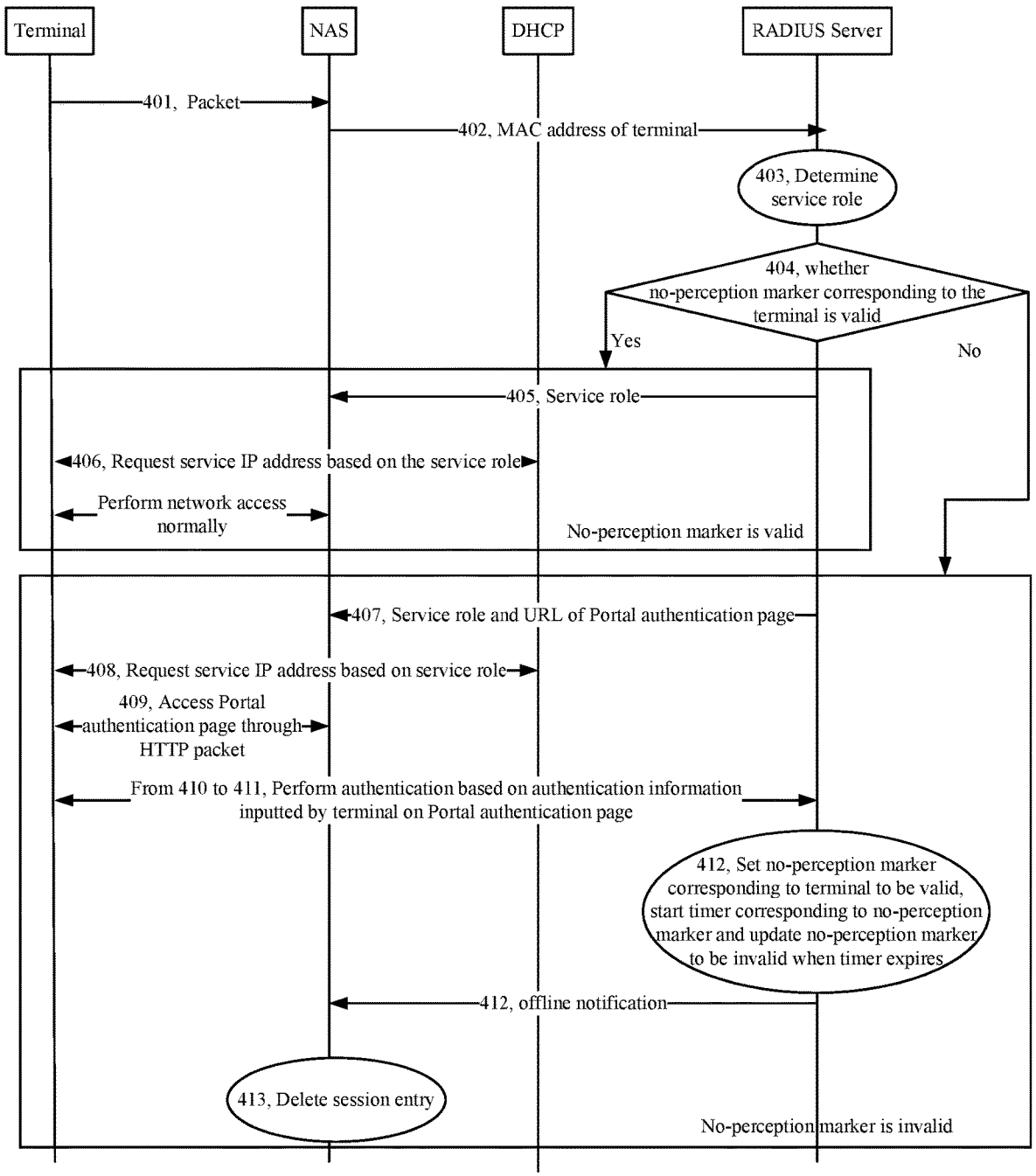
FIG. 4 is a schematic diagram illustrating an online process after a terminal is registered to a RADIUS Server based on an example of the present disclosure.

FIG. 4 is a schematic diagram illustrating an online process after a terminal is registered to a RADIUS Server based on an example of the present disclosure. As shown in FIG. 4, the process includes procedures as follows.

In block 401, the terminal sends a packet after coming online again.

In block 402, the NAS receives the packet sent by the terminal, and sends a MAC address of the terminal to the RADIUS Server when determining that no session entry matched to the terminal is stored in the NAS.

In an example of the present disclosure, the MAC address of the terminal may be carried in an Access Request to be sent to the RADIUS Server.

In block 403, the RADIUS Server receives the MAC address of the terminal sent by the NAS; when determining that registration information corresponding to the MAC address of the terminal is stored in the RADIUS Server, the RADIUS Server determines a service role to which the terminal belongs based on the account information of the terminal in the registration information.

As described above, the service role may be a service VLAN or a service VxLAN to which the terminal belongs.

In block 404, the RADIUS Server determines whether a no-perception marker corresponding to the terminal is valid; if yes, procedures in block 405 are executed; if no, procedures in block 407 are executed.

In block 405, the RADIUS Server sends the determined service role to the NAS.

The procedures in the block 405 are executed when the RADIUS Server determines that the registration information matched to the terminal is stored in the RADIUS Server and the no-perception marker corresponding to the terminal is valid.

Blocks 403 to 405 include a specific implementation that the NAS obtains the service role for the terminal in block 203.

In block 406, the NAS receives the service role sent by the RADIUS Server, creates a session entry matched to the terminal; when receiving a DHCP request sent by the terminal, the NAS requests a corresponding IP address (denoted as a service IP address) in an IP network segment corresponding to the service role for the terminal, and notifies the service IP address to the terminal.

In an example, the received DHCP request may be a DCHP request sent by the terminal at expiry of the lease for the temporary IP address.

In an example, the terminal sends the DHCP request for obtaining the service IP address at expiry of the lease for the temporary IP address, and performs network access based on the service IP address. When the NAS does not receive a packet in a long time period, the NAS may delete the session entry corresponding to the terminal to make the terminal to go offline. When the terminal comes online again, the terminal may send a DHCP request for requesting a new service IP address. In this case, the received DHCP request may a DHCP request sent by the terminal according to a service requirement.

For example, when obtaining the service IP address, the terminal is shut down. Since no packet is received in a long time period, the NAS deletes the session entry corresponding to the terminal to make the terminal to go offline. Since the terminal does not store the obtained service IP address after the terminal is shut down, the terminal sends the DHCP request to the NAS when the terminal is powered on, so as to make the NAS for requesting the new IP address for the terminal.

In block 406, when no DHCP request sent by the terminal is received, the NAS controls the terminal to perform access based on the service role, wherein the terminal uses the requested service IP address to perform network access based on the service role.

In an example, the terminal may sends the DHCP request to a DHCP Relay, and the DHCP Relay requests the service IP address for the terminal to the DHCP Service, wherein the DHCP relay may be located in a same physical device with the NAS, or may be located in a different physical device from the NAS, which is not limited in examples of the present disclosure.

In an example, the NAS records the received service role into the session entry matched to the terminal.

When the NAS notifies the requested service IP address to the terminal, the terminal may send an HTTP packet based on the service IP address. A source IP address of the HTTP packet is the service IP address above. Eventually, the terminal normally performs network access based on the service IP address.

In block 407, the RADIUS Server sends the service role and a URL associated with a Portal authentication page to the NAS.

When the RADIUS Server determines that the registration information matched to the terminal is stored in the RADIUS Server and the no-perception marker corresponding to the terminal is invalid, procedures in block 407 are executed.

In an example, the RADIUS Server may further send a second ACL to the NAS in an Access Accept together with the service role and the URL associated with the Portal authentication page above. The second ACL is used for the NAS to only accept a DHCP packet and an HTTP request sent by the terminal based on the service role and to deny any other packet, so that the terminal is forced only to perform HTTP access or request an IP address based on DHCP.

In block 408, the NAS receives the service role and the URL associated with the Portal authentication page, creates a session entry matched to the terminal, wherein the service role and the URL associated with the Portal authentication page are sent by the RADIUS Server; when receiving a DHCP request sent by the terminal, the NAS requests a corresponding IP address (denoted as a service IP address) in an IP network segment corresponding to the service role for the terminal, and notifies the service IP address to the terminal.

In an example, the terminal sends the DHCP request for obtaining the service IP address at expiry of the lease for the temporary IP address, and performs network access based on the service IP address. When the NAS does not receive a packet in a long time period, the NAS may delete the session entry corresponding to the terminal to make the terminal to go offline. When the terminal comes online again, the terminal may send a DHCP request for requesting a new service IP address. In this case, the received DHCP request may a DHCP request sent by the terminal according to a service requirement.

For example, when obtaining the service IP address, the terminal is shut down. Since no packet is received in a long time period, the NAS deletes the session entry corresponding to the terminal to make the terminal to go offline. Since the terminal does not store the obtained service IP address after the terminal is shut down, the terminal sends a DHCP request to the NAS when the terminal is powered on, so as to make the NAS for requesting a new IP address for the terminal.

In block 408, when no DHCP request sent by the terminal is received, the NAS controls the terminal to perform access based on the service role, wherein the terminal uses the requested service IP address to perform network access based on the service role.

In an example, the terminal may send the DHCP request to a DHCP Relay, and the DHCP Relay requests the service IP address for the terminal to the DHCP Service, wherein the DHCP relay may be located in a same physical device with the NAS, or may be located in a different physical device from the NAS, which is not limited in examples of the present disclosure.

When the NAS notifies the requested service IP address to the terminal, the terminal may send an HTTP packet based on the service IP address. A source IP address of the HTTP packet is the service IP address above.

In block 409, the NAS captures the HTTP packet sent by the terminal based on the service IP address, and performs HTTP redirection processing, so as to make the terminal to access the Portal authentication page.

Based on the second ACL and the HTTP redirection processing method as described above, the terminal may eventually access the Portal authentication page. In an example of the present disclosure, the terminal may eventually access the Portal authentication page in another manner instead of the second ACL and the HTTP redirection processing method.

In block 410, the terminal receives authentication information inputted by a user on the Portal authentication page.

The procedures in blocks 408 to 410 include a specific implementation way that the NAS controls the terminal to perform the portal authentication based on the service IP address.

In block 411, the RADIUS Server performs authentication based on the authentication information inputted by the user on the Portal authentication page. When the authentication passes, procedures in block 412 are executed.

In block 412, the RADIUS Server sends an offline notification to the NAS, sets the no-perception marker corresponding to the terminal to be valid, starts a timer corresponding to the no-perception marker, and updates the no-perception marker to be invalid when the timer expires.

If the second ACL is sent to the NAS in block 407 above, the RADIUS Server further sends a second ACL deleting notification to the NAS in block 412.

In block 413, the NAS receives the offline notification, and deletes the session entry above based on the offline notification to force the terminal to go offline and come online again.

In examples of the present disclosure, the NAS may delete the session entry matched to the terminal every time when the terminal goes offline.

During the MAC Portal Plus authentication, when the terminal comes online again after block 413, procedures in blocks 401 to block 413 are executed.

When the second ACL deleting notification is sent to the NAS in block 412, the NAS receives the second ACL deleting notification, and deletes the second ACL based on the second ACL deleting notification in the block 413.

So far, the process shown in FIG. 4 ends.

In description for FIGS. 3 and 4, the offline notification may be a COA message above or a custom notification, which is not limited in examples of the present disclosure.

As described above, in the MAC Portal Plus authentication, after the terminal is registered to the RADIUS Server, the RADIUS Server stores the registration information of the terminal (specifically a binding relationship between the MAC address of the terminal and the account of the terminal) in a long time period and does not delete the registration information, when the no-perception marker becomes invalid. For example, when the terminal comes online for the first time, the terminal is registered, and obtains a temporary IP address. And the temporary IP address is changed to a service IP address through a minimum lease after dozens of seconds or one minute. Afterwards, the terminal is no longer perform the operation of changing the temporary IP address to the service IP address as well as the process of requesting the temporary IP address above, thereby greatly improving efficiency.

Methods according to the present disclosure are described above. Devices according to the present disclosure are described below.

Figure 5:
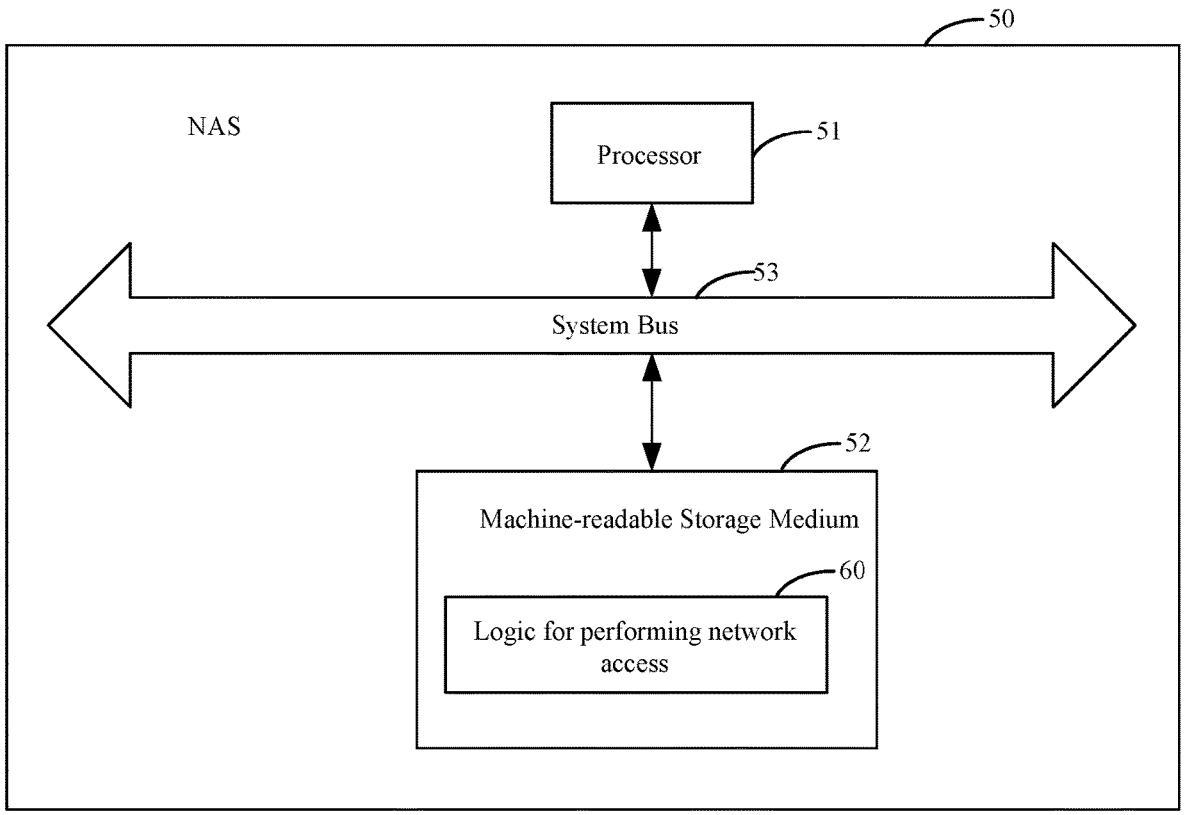
FIG. 5 is a schematic diagram illustrating a hardware structure of a NAS based on an example of the present disclosure.

FIG. 5 schematically illustrates a hardware structure diagram of a NAS, which is provided by an example of the present disclosure. The NAS 50 may include a processor 51 and a machine-readable storage medium 52 storing machine-executable instructions. The processor 51 may communicate with the machine-readable storage medium 52 via a system bus 53, and execute the method of controlling network access described above by reading and executing the machine-executable instructions corresponding to a logic for controlling network access in the machine-readable storage medium 52.

As used herein, the machine-readable storage medium 52 may be any electronic, magnetic, optical, or other physical storage apparatus to contain or store information such as executable instructions, data, and the like. For example, any machine-readable storage medium 52 described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof.

Figure 6:
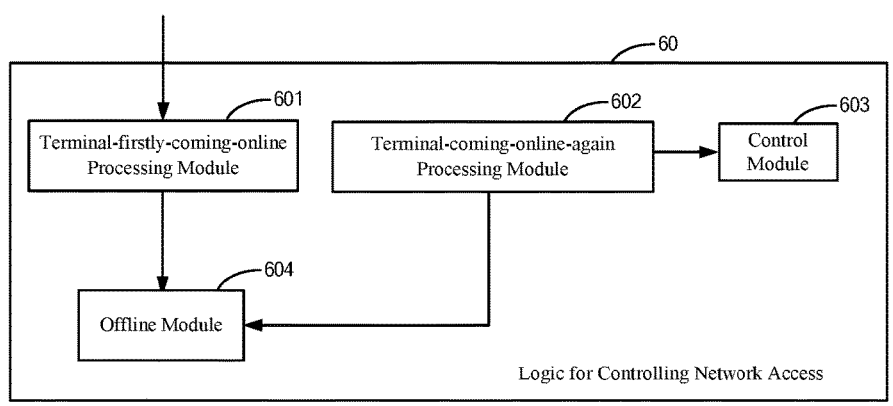
FIG. 6 is a schematic diagram illustrating a structure of logic for controlling network access based on an example of the present disclosure.

As shown in FIG. 6, functionally divided, the logic 60 for controlling network access above may include modules as follows.

A terminal-firstly-coming-online processing module 601 is configured to when a terminal comes online for a first time, obtain a temporary role for a terminal; when receiving a first IP address request from the terminal, request a temporary Internet Protocol (IP) address for the terminal, control the terminal to perform a portal authentication based on the temporary IP address, wherein the temporary IP address belongs to an IP network segment corresponding to the temporary role, and a lease for the temporary IP address is a set minimum lease.

An offline module 604 is configured to force the terminal to go offline based on an offline notification when the portal authentication is successful.

A terminal-coming-online-again processing module 602 is configured to when the terminal comes online for a second time, obtain a service role for the terminal; when receiving a second IP address request sent by the terminal at expiry of the lease for the temporary IP address, request a first service IP address for the terminal, control the terminal to perform the network access based on the first service IP address, wherein the first service IP address belongs to an IP network segment corresponding to the service role.

In an example, when the terminal comes online for the first time, the terminal-firstly-coming-online processing module 601 is configured to: when the terminal comes online for the first time, send a Media Access Control (MAC) address of the terminal to a Remote Authentication Dial In User Service (RADIUS) Server, receive a temporary role sent by the RADIUS Server, when the RADIUS Server determines that no registration information corresponding to the MAC address is recorded, wherein the registration information records the MAC address of the terminal and corresponding account information of the terminal.

In an example, when the terminal comes online for the second time, the terminal-coming-online-again processing module 602 is configured to: when the terminal comes online for the second time, send a MAC address of the terminal to the RADIUS Server; receive the service role matched to the MAC address and sent by the RADIUS Server, when the RADIUS Server determines that registration information corresponding to the MAC address is recorded and a recorded no-perception marker corresponding to the terminal is valid, wherein the registration information records the MAC address of the terminal and corresponding account information of the terminal.

In an example, the terminal-coming-online-again processing module 602 is further configured to: when the terminal comes online again, send a MAC address of the terminal to the RADIUS server; receive the service role matched to the MAC address and a Uniform Resource Locator (URL) associated with the portal authentication, wherein the service role matched to the MAC address and the URL associated with the portal authentication are sent by the RADIUS Server, when the RADIUS Server determines that registration information corresponding to the MAC address is recorded and the recorded no-perception marker corresponding to the terminal is invalid; request a second service IP address for the terminal when receiving a third IP address request sent by the terminal, wherein the second IP address belongs to the IP network segment corresponding to the service role.

The offline module 604 is further configured to control the terminal to perform the portal authentication based on the second service IP address; when the portal authentication is successful, forcing, by the NAS, the terminal to go offline based on an obtained offline notification so that the terminal comes online again.

In an example, the logic further includes a module as follows.

A control module 603 is configured to obtain the service role for the terminal; control the terminal to perform the network access based on the service role, wherein the terminal uses the requested second service IP when performing the network access based on the service role.

In an example, the terminal-coming-online-again processing module 602 is further configured to: when the terminal comes online again, send the MAC address of the terminal to the RADIUS server; receive the service role matched to the MAC address and sent by the RADIUS Server, when MAC address determines that registration information corresponding to the MAC address is recorded and a recorded no-perception marker corresponding to the terminal is valid; request a second service IP address for the terminal when receiving a third IP address request sent by the terminal, wherein the second IP address belongs to the IP network segment corresponding to the service role.

The offline module 604 is further configured to control the terminal to perform network access based on the service role, wherein the terminal uses the requested second service IP address when performing network access based on the service role.

In an example, when the portal authentication is successful, the no-perception marker is set to be valid, and a timer corresponding to the no-perception marker is started; when the timer expires, the no-perception marker is changed to be invalid.

In an example, the offline module 604 is configured to receive an offline notification when the portal authentication is successful, detect a recorded session entry corresponding to the terminal to force the terminal to go offline.

So far, description about the structure of the logic ends.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected based on actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and a device based on the embodiments of the present disclosure. Specific examples are used herein to set forth the principles and the implementing modes of the present disclosure, and the descriptions of the above embodiments are only meant to help understanding of the method and the core idea of the present disclosure. Besides, for those of ordinary skill in the art, alterations may be made to the specific embodiments and the scope of application in accordance with the idea of the present disclosure. In conclusion, the contents of the present specification shall not be interpreted as limitations to the present disclosure.

The invention claimed is:

1. A method of controlling network access in Virtual Extensible Local Area Network (VxLAN), comprising:
when a terminal comes online for a first time, obtaining, by a Network Attached Server (NAS), a temporary role for a terminal,
when receiving a first Internet Protocol (IP) address request from the terminal,
requesting, by the NAS, a temporary IP address for the terminal,
controlling, by the NAS, the terminal to perform a portal authentication based on the temporary IP address,
wherein the temporary IP address belongs to an IP network segment corresponding to the temporary role, and a lease for the temporary IP address is a set minimum lease;
forcing, by the NAS, the terminal to go offline based on an obtained offline notification when the portal authentication is successful;
when the terminal comes online for a second time, obtaining, by the NAS, a service role for the terminal from a Remote Authentication Dial In User Service (RADIUS) Server, which is determined by the RADIUS Server based on account information of the terminal in registration information, wherein the registration information records an MAC address of the terminal and corresponding account information of the terminal, and the service role is a service Virtual Local Area Network (VLAN) or a service VxLAN,
when receiving a second IP address request sent by the terminal at expiry of the lease for the temporary IP address,
requesting, by the NAS, a first service IP address for the terminal, controlling, by the NAS, the terminal to perform the network access based on the first service IP address,
wherein the first service IP address belongs to an IP network segment corresponding to the service role.

2. The method according to claim 1, wherein obtaining the temporary role for the terminal when the terminal comes online for the first time comprises:
when the terminal comes online for the first time,
sending, by the NAS, a Media Access Control (MAC) address of the terminal to the RADIUS Server;
receiving, by the NAS, a temporary role sent by the RADIUS Server when the RADIUS Server determines that no registration information corresponding to the MAC address is recorded,
wherein the registration information records the MAC address of the terminal and corresponding account information of the terminal.

3. The method according to claim 1, wherein obtaining the service role for the terminal when the terminal comes online for the second time comprises:
when the terminal comes online for the second time,
sending, by the NAS, a MAC address of the terminal to the RADIUS Server;
receiving, by the NAS, the service role which is matched to the MAC address and sent by the RADIUS Server when the RADIUS Server determines that registration information corresponding to the MAC address is recorded and a recorded no-perception marker corresponding to the terminal is valid,
wherein the registration information records the MAC address of the terminal and corresponding account information of the terminal.

4. The method according to claim 1, further comprising:
when the terminal comes online again,
sending, by the NAS, a MAC address of the terminal to the RADIUS server;
receiving, by the NAS, a service role matched to the MAC address and a Uniform Resource Locator (URL) associated with the portal authentication, wherein the service role matched to the MAC address and the URL associated with the portal authentication are sent by the RADIUS Server when the RADIUS Server determines that registration information corresponding to the MAC address is recorded and a recorded no-perception marker corresponding to the terminal is invalid;
requesting, by the NAS, a second service IP address for the terminal when receiving a third IP address request sent by the terminal, wherein the second IP address belongs to the IP network segment corresponding to the service role;
controlling, by the NAS, the terminal to perform the portal authentication based on the second service IP address; when the portal authentication is successful, forcing, by the NAS, the terminal to go offline based on an obtained offline notification so that the terminal comes online again.

5. The method according to claim 4, wherein when the terminal comes online again, the method further comprises:
obtaining, by the NAS, the service role for the terminal;
controlling, by the NAS, the terminal to perform the network access based on the service role, wherein the terminal uses the requested second service IP when performing the network access based on the service role.

6. The method according to claim 1, further comprising:
when the terminal comes online again,
sending, by the NAS, a MAC address of the terminal to the RADIUS server;
receiving, by the NAS, a service role which is matched to the MAC address and sent by the RADIUS Server when the RADIUS Server determines that registration information corresponding to the MAC address is recorded and a recorded no-perception marker corresponding to the terminal is valid;
requesting, by the NAS, a second service IP address for the terminal when receiving a third IP address request sent by the terminal, wherein the second IP address belongs to the IP network segment corresponding to the service role;
controlling, by the NAS, the terminal to perform network access based on the service role, wherein the terminal uses the requested second service IP address when performing network access based on the service role.

7. A Network Attached Server (NAS) in Virtual Extensible Local Area Network (VxLAN), comprising:
a processor, and
a machine-readable storage medium storing machine executable instructions which are executable by the processor to cause the NAS to:
when a terminal comes online for a first time, obtain a temporary role for a terminal,
when receiving a first Internet Protocol (IP) address request from the terminal,
request a temporary IP address for the terminal,
control the terminal to perform a portal authentication based on the temporary IP address,
wherein the temporary IP address belongs to an IP network segment corresponding to the temporary role, and a lease for the temporary IP address is a set minimum lease;
force the terminal to go offline based on an obtained offline notification when the portal authentication is successful;
when the terminal comes online for a second time, obtain a service role for the terminal from a Remote Authentication Dial In User Service (RADIUS) Server, which is determined by the RADIUS Server based on account information of the terminal in registration information, wherein the registration information records an MAC address of the terminal and corresponding account information of the terminal, and the service role is a service Virtual Local Area Network (VLAN) or a service VxLAN,
when receiving a second IP address request sent by the terminal at expiry of the lease for the temporary IP address,
request a first service IP address for the terminal,
control the terminal to perform the network access based on the first service IP address,
wherein the first service IP address belongs to an IP network segment corresponding to the service role.

8. The server according to claim 7, wherein the machine-executable instructions are executable by the processor to cause the NAS to:
when the terminal comes online for the first time,
send a Media Access Control (MAC) address of the terminal to the RADIUS Server;

receive a temporary role sent by the RADIUS Server when the RADIUS Server determines that no registration information corresponding to the MAC address is recorded,
wherein the registration information records the MAC address of the terminal and corresponding account information of the terminal.

9. The server according to claim 7, wherein the machine-executable instructions are executable by the processor to cause the NAS to:
when the terminal comes online for the second time,
send a MAC address of the terminal to the RADIUS Server;
receive a service role which is matched to the MAC address and sent by the RADIUS Server when the RADIUS Server determines that registration information corresponding to the MAC address is recorded and a recorded no-perception marker corresponding to the terminal is valid,
wherein the registration information records the MAC address of the terminal and corresponding account information of the terminal.

10. The server according to claim 7, wherein the machine-executable instructions are executable by the processor to further cause the NAS to:
when the terminal comes online again,
send a MAC address of the terminal to the RADIUS server;
receive a service role matched to the MAC address and a Uniform Resource Locator (URL) associated with the portal authentication, wherein the service role matched to the MAC address and the URL associated with the portal authentication are sent by the RADIUS Server when the RADIUS Server determines that registration information corresponding to the MAC address is recorded and a recorded no-perception marker corresponding to the terminal is invalid;
request a second service IP address for the terminal when receiving a third IP address request sent by the terminal, wherein the second IP address belongs to the IP network segment corresponding to the service role;
control the terminal to perform the portal authentication based on the second service IP address; when the portal authentication is successful, force the terminal to go offline based on an obtained offline notification so that the terminal comes online again.

11. The server according to claim 10, wherein the machine-executable instructions are executed by the processor to further cause the NAS to:
obtain the service role for the terminal;
control the terminal to perform the network access based on the service role, wherein the terminal uses the requested second service IP when performing the network access based on the service role.

12. The server according to claim 7, wherein the machine-executable instructions are executable by the processor to further cause the NAS to:
when the terminal comes online again,
send an MAC address of the terminal to the RADIUS server;
receive a service role matched to the MAC address and sent by the RADIUS Server when the RADIUS Server determines that registration information corresponding to the MAC address is recorded and a recorded no-perception marker corresponding to the terminal is valid;
request a second service IP address for the terminal when receiving a third IP address request sent by the terminal, wherein the second IP address belongs to the IP network segment corresponding to the service role;
control the terminal to perform the network access based on the service role, wherein the terminal uses the requested second service IP address when performing the network access based on the service role.

13. A non-transitory machine-readable storage medium storing machine-executable instructions which are invoked and executed by a processor of a Network Attached Server (NAS) in Virtual Extensible Local Area Network (VxLAN) to cause the NAS to:
when a terminal comes online for a first time, obtain a temporary role for a terminal,
when receiving a first Internet Protocol (IP) address request from the terminal,
request a temporary IP address for the terminal,
control the terminal to perform a portal authentication based on the temporary IP address,
wherein the temporary IP address belongs to an IP network segment corresponding to the temporary role, and a lease for the temporary IP address is a set minimum lease;
force the terminal to go offline based on an obtained offline notification when the portal authentication is successful;
when the terminal comes online for a second time, obtain a service role for the terminal from a Remote Authentication Dial In User Service (RADIUS) Server, which is determined by the RADIUS Server based on account information of the terminal in registration information, wherein the registration information records an MAC address of the terminal and corresponding account information of the terminal, and the service role is a service Virtual Local Area Network (VLAN) or a service VxLAN,
when receiving a second IP address request sent by the terminal at expiry of the lease for the temporary IP address,
request a first service IP address for the terminal,
control the terminal to perform the network access based on the first service IP address,
wherein the first service IP address belongs to an IP network segment corresponding to the service role.

14. The non-transitory machine-readable storage medium according to claim 13, wherein the machine-executable instructions are executable by the processor to cause the NAS to:
when the terminal comes online for the first time,
send a Media Access Control (MAC) address of the terminal to the RADIUS Server;
receive a temporary role sent by the RADIUS Server when the RADIUS Server determines that no registration information corresponding to the MAC address is recorded,
wherein the registration information records the MAC address of the terminal and corresponding account information of the terminal.

15. The non-transitory machine-readable storage medium according to claim 13, wherein the machine-executable instructions are executable by the processor to cause the NAS to:
when the terminal comes online for the second time, send a MAC address of the terminal to the RADIUS Server;
receive a service role which is matched to the MAC address and sent by the RADIUS Server when the RADIUS Server determines that registration information corresponding to the MAC address is recorded and a recorded no-perception marker corresponding to the terminal is valid,
wherein the registration information records the MAC address of the terminal and corresponding account information of the terminal.

* * * * *